(12) United States Patent
Suzuki

(10) Patent No.: US 8,172,018 B2
(45) Date of Patent: May 8, 2012

(54) CONTROL APPARATUS FOR VEHICULAR POWER TRANSMITTING SYSTEM

(75) Inventor: Yoshitaka Suzuki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 487 days.

(21) Appl. No.: 12/522,649

(22) PCT Filed: Jan. 5, 2008

(86) PCT No.: PCT/JP2008/050008
§ 371 (c)(1),
(2), (4) Date: Jul. 9, 2009

(87) PCT Pub. No.: WO2008/084766
PCT Pub. Date: Jul. 17, 2008

(65) Prior Publication Data
US 2009/0314565 A1    Dec. 24, 2009

(30) Foreign Application Priority Data
Jan. 10, 2007  (JP) .................................. 2007-002885

(51) Int. Cl.
*B60W 20/00*    (2006.01)
(52) U.S. Cl. ............................. 180/65.285; 180/65.265
(58) Field of Classification Search ............. 180/65.265, 180/65.285
See application file for complete search history.

(56) References Cited

U.S. PATENT DOCUMENTS

| | | | |
|---|---|---|---|
| 6,832,148 B1 * | 12/2004 | Bennett et al. .................. | 701/54 |
| 7,108,087 B2 * | 9/2006 | Imai ........................... | 180/65.23 |
| 7,559,871 B2 * | 7/2009 | Amano et al. .................... | 477/3 |
| 7,653,474 B2 * | 1/2010 | Cawthorne et al. ............. | 701/99 |
| 7,670,253 B2 * | 3/2010 | Sah ................................ | 477/3 |
| 7,695,387 B2 * | 4/2010 | Oba ................................ | 475/5 |
| 7,798,938 B2 * | 9/2010 | Matsubara et al. ............... | 477/3 |
| 7,806,795 B2 * | 10/2010 | Oba et al. ........................ | 475/5 |
| 7,828,693 B2 * | 11/2010 | Soliman et al. .................... | 477/3 |
| 7,841,433 B2 * | 11/2010 | Soliman et al. .......... | 180/65.265 |

(Continued)

FOREIGN PATENT DOCUMENTS
JP    2002-225578 A    8/2002

(Continued)

*Primary Examiner* — Jeffrey J Restifo
(74) *Attorney, Agent, or Firm* — Sughrue Mion, PLLC

(57) ABSTRACT

A control apparatus for a hybrid vehicle power transmitting system wherein an electric motor is connected through a step-variable transmission to a drive-wheel-side output shaft to which a drive force of a main drive power source is distributed by a power distributing device, which control apparatus is configured to reduce a shifting shock upon a shifting action of the step-variable transmission wherein when
at least one of the operating states of transmission 20 and electric-energy storage device 32 satisfies a predetermined condition, the degree of limitation or reduction of a torque reduction amount of MG2 by MG2-torque-reduction-control limiting portion 142 is reduced with respect to that when at least one of the operating states does not satisfy the predetermined condition, while output torque of MG1 is reduced by MG1-torque-reduction control portion 144, so that a shifting shock of the transmission 20 upon its shifting action can be reduced by implementing the torque reduction control of the MG1 while reducing the degree of the limitation of the torque reduction control of the MG2 when it is determined that the limitation of the torque reduction control of the MG2 has a considerable influence on the shifting action.

4 Claims, 9 Drawing Sheets

U.S. PATENT DOCUMENTS

| | | | |
|---|---|---|---|
| 7,869,926 B2 * | 1/2011 | Tuckfield et al. | 701/56 |
| 7,908,064 B2 * | 3/2011 | Cawthorne et al. | 701/51 |
| 7,931,102 B2 * | 4/2011 | Katsuta et al. | 180/65.225 |
| 7,987,934 B2 * | 8/2011 | Huseman | 180/65.21 |
| 8,047,314 B2 * | 11/2011 | Oba et al. | 180/65.265 |
| 8,067,908 B2 * | 11/2011 | Heap et al. | 318/139 |
| 2004/0192494 A1 | 9/2004 | Ozeki et al. | |

FOREIGN PATENT DOCUMENTS

| | | |
|---|---|---|
| JP | 2004-204957 A | 7/2004 |
| JP | 2004-217096 A | 8/2004 |
| JP | 2005-297948 A | 10/2005 |
| JP | 2005-308007 A | 11/2005 |
| JP | 2005-313865 A | 11/2005 |
| JP | 2006-182272 A | 7/2006 |
| JP | 2006-193115 A | 7/2006 |
| JP | 2006-248466 A | 9/2006 |
| JP | 2006-250111 A | 9/2006 |
| JP | 2006-315451 A | 11/2006 |

* cited by examiner

|  | SLB1 | SLB2 | B1 | B2 |
|---|---|---|---|---|
| LOW GEAR POSITION L (FIRST GEAR POSITION) | ○ | ○ | × | ○ |
| HIGH GEAR POSITION H (SECOND GEAR POSITION) | × | × | ○ | × | ced
CONTROL APPARATUS FOR VEHICULAR POWER TRANSMITTING SYSTEM

CROSS REFERENCE TO RELATED APPLICATION

This application is a National Stage of International Application No. PCT/JP2008/050008 filed Jan. 5, 2008 claiming priority based on Japanese Patent Application No. 2007-002885, filed Jan. 10, 2007, the contents of all of which are incorporated herein by reference in their entirety.

TECHNICAL FIELD

The present invention relates to a control apparatus for a power transmitting system of a hybrid vehicle wherein an electric motor is connected through a step-variable transmission to a drive-wheel-side output shaft to which a drive force of a main drive power source is distributed by a power distributing device, and more particularly to an improvement for reducing a shifting shock upon a shifting action of the step-variable transmission.

BACKGROUND ART

There is known a vehicular power transmitting system including a power distributing device which distributes a drive force produced by a main drive power source to a first electric motor and a power transmitting member, a second electric motor connected through a step-variable transmission to a power transmitting path between the power transmitting member and a vehicle drive wheel, and an electric-energy storage device which stores an electric energy generated by the first and second electric motors and supplies the electric energy to the first and second electric motors. Regarding such a vehicular power transmitting system, there has been proposed a technique wherein a torque-reduction control is implemented to reduce an output toque of the second electric motor during a shifting action of the step-variable transmission, and an amount of reduction of the output torque of the second electric motor during the torque-reduction control is limited according to an amount of limitation of charging and discharging of the electric-energy storage device. Patent Document 1 describes an example of such a power transmitting system. According to this technique, a lower limit of the output torque of the second electric motor calculated on the basis of target speed and torque values of the first electric motor is limited by a lower-limit limiting value of the second electric motor calculated on the basis of an input limit value of the electric-energy storage device, for reducing a shifting shock upon a shifting action of the step-variable transmission while effectively preventing an overcharging of the electric-energy storage device.
Patent Document 1: JP-2005-297948 A
Patent Document 2: JP-2002-225578 A In the prior art technique, however, the torque reduction control (amount of reduction of the torque) of the second electric motor is limited while the input to the electric-energy storage device is limited, giving rise to a risk of generation of a shifting shock due to a delay of the shifting action of the step-variable transmission which is caused by an insufficient engaging force of a frictional coupling element incorporated in the step-variable transmission under some condition of the vehicle. In view of this drawback, there has been a need for developing a control apparatus for a vehicular power transmitting system wherein an electric motor is connected through a step-variable transmission to a drive-wheel-side output shaft to which a drive force of a main drive power source is distributed by a power distributing device, which control apparatus is configured to reduce a shifting shock upon a shifting action of the step-variable transmission.

DISCLOSURE OF THE INVENTION

Object Achieved by the Invention

The present invention was made in view of the background art discussed above. It is therefore an object of the present invention to provide a control apparatus for a hybrid vehicle power transmitting system wherein an electric motor is connected through a step-variable transmission to a drive-wheel-side output shaft to which a drive force of a main drive power source is distributed by a power distributing device, which control apparatus is configured to reduce a shifting shock upon a shifting action of the step-variable transmission.

Means for Solving the Problem

The object indicated above can be achieved according to the present invention, which provides a control apparatus for a vehicular power transmitting system provided with a power distributing device for distributing a drive force generated by a main drive power source to a first electric motor and a power transmitting member, a second electric motor connected through a step-variable transmission to a power transmitting path between the power transmitting member and a drive wheel, and an electric-energy storage device for storing an electric energy generated by the first electric motor and/or the second electric motor and for supplying the electric energy to the first electric motor and/or the second electric motor, the control apparatus including second-electric-motor-torque-reduction control means for implementing a torque reduction control for reducing an output torque of the second electric motor during a shifting action of the step-variable transmission, and second-electric-motor-torque-reduction-control limiting means for limiting a torque reduction amount of the second electric motor in the torque reduction control by the second-electric-motor-torque-reduction control means, according to an upper limit of a charging/discharging amount of the electric-energy storage device, the control apparatus being characterized by comprising first-electric-motor-torque reduction control means for implementing a torque reduction control for reducing an output torque of the first electric motor, and wherein the second-electric-motor-torque-reduction-control limiting means is configured such that when at least one of operating states of the step-variable transmission and the electric-energy storage device satisfies a predetermined condition, a degree of limitation of the torque reduction amount of the second electric motor is reduced with respect to that when at least one of the operating states does not satisfy the predetermined condition, while the output torque of the first electric motor is reduced by the first-electric-motor-torque-reduction control means.

Advantages of the Invention

According to the present invention described above, the control apparatus includes the second-electric-motor-torque-reduction control means for implementing the torque reduction control for reducing the output torque of the second electric motor during a shifting action of the step-variable transmission, the second-electric-motor-torque-reduction-control limiting means for limiting or reducing the torque reduction amount of the second electric motor in the torque reduction control by the second-electric-motor-torque-reduction control means, according to the upper limit of a charging/discharging amount of the electric-energy storage device, and the first-electric-motor-torque reduction control means for implementing the torque reduction control for reducing the output torque of the first electric motor. The second-electric-motor-torque-reduction-control limiting means is configured such that when at least one of the operating states of the step-variable transmission and the electric-energy storage device satisfies the predetermined condition, the degree of limitation or reduction of the torque reduction amount of the second electric motor is reduced with respect to that when at least one of the operating states does not satisfy the predetermined condition, while the output torque of the first electric motor is reduced by the first-electric-motor-torque-reduction control means. Accordingly, a shifting shock of the step-variable transmission upon its shifting action can be reduced by implementing the torque reduction control of the first electric motor while reducing the degree of the limitation or reduction of the torque reduction control of the second electric motor when it is determined that the limitation or reduction of the torque reduction control of the second electric motor has a considerable influence on the shifting action. Thus, the present invention provides a control apparatus for a vehicular power transmitting system wherein an electric motor is connected through a step-variable transmission to a drive-wheel-side output shaft to which a drive force of a main drive power source is distributed by a power distributing device, which control apparatus is configured to reduce a shifting shock upon a shifting action of the step-variable transmission.

Preferably, the second-electric-motor-torque-reduction-control limiting means inhibits the limitation of the torque reduction amount of the second electric motor while the output torque of the first electric motor is reduced by the first-electric-motor-torque-reduction control means, when the at least one of the operating states of the step-variable transmission and the electric-energy storage device satisfies the predetermined condition. In this case, the shifting shock of the step-variable transmission upon its shifting action can be practically reduced by implementing the torque reduction control of the first electric motor while reducing the degree of the limitation or reduction of the torque reduction control of the second electric motor when it is determined that the limitation or reduction of the torque reduction control of the second electric motor has a considerable influence on the shifting action.

Preferably, the operating state of the step-variable transmission is a temperature of a working fluid used for controlling an engaging force of frictional coupling elements provided in the step-variable transmission, and the predetermined condition is a condition that the temperature of the working fluid is lower than a predetermined threshold. When the temperature of the working fluid used for the step-variable transmission is comparatively low, a response to the line pressure control is comparatively low. In this case, there is a high need for compensation for insufficiency of the engaging force by implementing the torque reduction control of the second electric motor, so that the step-variable transmission is likely to suffer from the shifting shock when the torque reduction control of the second electric motor is limited. By limiting the torque reduction control of the first electric motor in this case, the amount of the torque reduction of the second electric motor is increased by the amount of the torque reduction control of the first electric motor, so that the shifting shock of the step-variable transmission upon its shifting action can be effectively reduced.

Preferably, the operating state of the electric-energy storage device is an upper limit of a charging/discharging amount of the electric-energy storage device, and the predetermined condition is a condition that the upper limit of the charging/discharging amount is larger than a predetermined threshold. When the upper limit of the charging/discharging amount of the electric-energy storage device is comparatively large, the amount of limitation of the torque reduction control of the second electric motor is comparatively large, so that the step-variable transmission is likely to suffer from the shifting shock when the insufficiency of the engaging force of the frictional coupling elements is compensated for by controlling the engaging force. By limiting the torque reduction control of the first electric motor in this case, the amount of the torque reduction of the second electric motor is increased by the amount of the torque reduction control of the first electric motor, so that the shifting shock of the step-variable transmission upon its shifting action can be effectively reduced.

BEST MODE FOR CARRYING OUT THE INVENTION

Referring to the drawings, there will be described in detail a preferred embodiment of the present invention.

Embodiment

Referring to the view of FIG. 1, there will be explained a hybrid drive system 8 to which the present invention is suitably applicable. The hybrid drive system 10 shown in FIG. 1 is suitably used for an FF vehicle, etc., and is provided with a vehicular power transmitting device 10 including a power distributing mechanism 16 for distributing a drive force generated by a main drive power source in the form of an engine 12 to a first electric motor in the form of a first motor/generator MG1 (hereinafter abbreviated as "MG11") and a power transmitting member in the form of an output shaft 14, and a second electric motor in the form of a second motor/generator MG2 (hereinafter abbreviated as "MG2") connected through a step-variable automatic transmission 20 (hereinafter referred to as device 16 and drive wheels 18. Torques generated by the engine 12 and MG1 are transmitted to the output shaft 14, and transmitted from the output shaft 14 to the pair of right and left drive wheels 18 through a differential gear device 19.

In the power transmitting system 10 described above, a torque capacity to be transmitted from the MG2 to the output shaft 14 is increased or reduced according to a speed ratio $\gamma_s$ of the transmission 20 (which is equal to operating speed Nmg2 of the MG2/rotating speed Nout of the output shaft 14). This speed ratio $\gamma_s$ of the transmission 20 is variable in a plurality of steps within a range not lower than "1", so that the torque generated by the MG2 while the MG2 is operated as a drive power source is increased, and the increased torque is transmitted to the output shaft 14, whereby the required capacity and size of the MG2 can be reduced. The speed ratio $\gamma_s$ of the transmission 20 is lowered to lower the operating speed of the MG2 for maintaining a high degree of operating efficiency of the MG2, as the rotating speed of the output shaft 14 is raised for increasing the vehicle speed. Conversely, the speed ratio $\gamma_s$ of the transmission 20 is raised as the rotating speed of the output shaft 14 is lowered.

The engine 12 described above is a known internal combustion engine such as a gasoline or diesel engine operable to generate a drive force by combustion of a fuel. An operating state of the engine 12 is electrically controlled by an electronic engine control device (E-ECU) 22 constituted principally by a microcomputer, which is configured to control an opening angle of a throttle valve, an intake air quantity, an amount of supply of a fuel and a timing of ignition of the engine 12. The electronic engine control device 22 is arranged to receive output signals of various sensors such as an accelerator operation-amount sensor AS provided to detect an operation amount of an accelerator pedal 24, and a brake sensor BS provided to detect an operation of a brake pedal 26.

The MG1 and MG2, which are synchronous motors, for example, are operable to function as at least one of an electric motor to generate a drive torque, and an electric generator, and are preferably operable to selectively function as either of the electric motor and the electric generator. The MG1 and MG2 are connected through respective inverters 28, 30 to an electric-energy storage device 32 such as a battery or capacitor. Output torques or regenerative torques of the MG1 and MG2 are regulated or set by an electronic motor-generator control device (MG-ECU) 34 constituted principally by a microcomputer, which is configured to control the inverters 28, 30. The electronic motor-generator control device 34 is arranged to receive output signals of various sensors such as a shift position sensor SS provided to detect an operating position of a shift lever 36.

The power distributing device 16 is a planetary gear device of a single-pinion type which is operable to perform a known differential function and which includes three rotary elements consisting of a sun gear S0, a ring gear R0 disposed coaxially with the sun gear S0, and a carrier C0 which supports a pinion gear P0 meshing with the sun gear S0 and ring gear R0, such that the pinion gear P0 is rotatable about its axis and about an axis of the carrier C0. The power distributing device 16 is disposed coaxially with the engine 12 and the transmission 20. Since the power distributing device 16 and transmission 20 are symmetric about their axes, a lower half thereof is not shown in FIG. 1.

In the present hybrid drive system 10, a crankshaft 38 of the engine 12 is connected to the carrier C0 of the power distributing device 16 through a damper 40, and the MG1 is connected to the sun gear S0, while the output shaft 14 is connected to the ring gear R0. It is noted that the carrier C0 functions as an input element, and the sun gear S0 functions as a reaction element, while the ring gear R0 functions as an output element.

Referring to the collinear chart of FIG. 2, there are indicated relative rotating speeds of the rotary elements of the power distributing device 16. In this collinear chart, the rotating speeds of the sun gear S0, carrier C0 and ring gear R0 are taken along respective vertical axes S, C and R. Distances between adjacent ones of the vertical axes S, C, R are determined such that the distance between the vertical axes C and R corresponds to ρ (number of teeth $Z_s$ of the sun gear S0/number of teeth $Z_r$ of the ring gear R0), where the distance between the vertical axes S and C corresponds to "1". In the power distributing device 16, the ring gear R0 generates an output torque larger than an output torque of the engine 12 when a reaction torque generated by the MG1 as a result of input of the output torque of the engine 12 to the carrier C0 is input to the sun gear S0. In this case, the MG1 functions as the electric generator. Further, an operating speed NE of the engine 12 is variable continuously (in a non-stepping manner) by changing an operating speed of the MG1 while the rotating speed N0 of the ring gear R0 is held constant. Broken line in FIG. 2 indicates a drop of the engine speed NE when the rotating speed of the MG1 is lowered from a value indicated by solid line. Namely, the engine speed NE can be controlled to a value for highest fuel economy by controlling the MG1. The hybrid drive system of this type is called a mechanical distribution type or split type.

Referring back to FIG. 1, the transmission 20 is constituted two planetary gear mechanisms of a Ravigneaux type. Described in detail, the transmission 20 includes a first sun gear S1, a second sun gear S2, a short pinion P1 meshing with the first sun gear S1, a long pinion P2 having a larger axial length and meshing with the short pinion P1, and a ring gear R1 meshing with the long pinion P2 and disposed coaxially with the sun gears S1, S2. The pinions P1, P2 are supported by a common carrier C1 such that each pinion P1, P2 is rotatable about its axis and about the axis of the common carrier C1. Further, the second sun gear S2 meshes with the long pinion P2. Further, the MG2 is connected to the second sun gear S2, while the carrier C1 is connected to the output shaft 14. The first sun gear S1 and ring gear R1 cooperate with the pinions P1, P2 to constitute a mechanism equivalent to a planetary gear set of a double-pinion type, while the second sun gear S2 and ring gear R2 cooperate with the long pinion P2 to constitute a mechanism equivalent to a planetary gear set of a single-pinion type.

The transmission 20 is provided with a first brake B1 disposed between the first sun gear S1 and a housing 42 to selectively fix the first sun gear S1 to the housing 42, and a second brake B2 disposed between the ring gear R1 and the housing 42 to selectively fix the ring gear R1 to the housing 42. These brakes B1, B2 are so-called frictional coupling elements arranged to generate a frictional braking force, which are preferably hydraulically operated frictional coupling devices of a multiple-disc type or a band type. Torque capacities of the brakes B1, B2 are continuously variable according to engaging hydraulic pressures generated by respective actuators.

The transmission 20 constructed as described above is placed in a high gear position H having a speed ratio $\gamma_{sh}$ higher than "1" when the second sun gear S2 functions as an input element, and the carrier C1 functions as an output element, while the first brake B1 is placed in an engaged state. When the second brake B2 rather than the first brake B1 is placed in an engaged state, the transmission 20 is placed in a low gear position L having a speed ratio $\gamma_{sl}$ higher than the speed ratio $\gamma_{sh}$. The transmission 20 is shifted between these two gear positions H, L, on the basis of a running condition of the vehicle such as a running speed of the vehicle and a required-vehicle-drive-force-related value (a target-vehicle-drive-force-related value). Described more specifically, the transmission 20 is shifted to establish one of the two gear positions H, L on the basis of the detected running condition of the vehicle and according to a stored shifting boundary line map obtained by experimentation for shifting actions between the two gear positions H, L. The shifting actions of the transmission 20 are controlled by an electronic transmission control device (T-ECU) 44 constituted principally by a microcomputer. The electronic transmission control device 44 is arranged to receive output signals of various sensors such as an oil temperature sensor TS provided to detect a temperature of a working oil of the transmission 20, a hydraulic pressure switch SW1 provided to detect the engaging hydraulic pressure of the first brake B1, a hydraulic pressure switch SW2 provided to detect the engaging hydraulic pressure of the second brake B2, and a hydraulic pressure switch SW3 provided to detect a line pressure PL.

Reference is made to the collinear chart of FIG. 3 having four vertical axes S1, R1, C1, S2 indicating a relationship among the rotary elements of the Ravigneaux type planetary gear mechanism of the transmission 20. In this collinear chart, the rotating speeds of the first sun gear S1, ring gear R1, carrier C1 and second sun gear S2 are taken along the respective vertical axes S1, R1, C1, S2. The transmission 20 constructed as described above is shifted to the low gear position L when the second brake B2 is engaged to hold the ring gear R1. In this low gear position L, the assisting torque generated by the MG2 is amplified according to the speed ratio γsl of the low gear position L, and the amplified assisting torque is transmitted to the output shaft 14. When the first brake B1 is engaged to hold the first sun gear S1, the transmission 20 is shifted to the high gear position H having the speed ratio γsh lower than the speed ratio γsl of the low gear position L. The speed ratio γsh of the high gear position H is also higher than "1", so that the assisting torque generated by the MG2 is amplified according to the speed ratio γsh, and the amplified assisting torque is transmitted to the output shaft 14. While the transmission 20 is held in the low or high gear position L, H, the torque transmitted to the output shaft 14 is the output torque of the MG2 as amplified according to the speed ratio γsl or γsh of the transmission 20. In the process of the shifting action of the transmission 20 to the low or high gear position L, H, however, the torque received by the output shaft 14 is subject to an influence of the torque capacities of the first or second brake B1, B2 and a change of an inertia torque of the transmission 20 due to a change of the rotating speed. Further, the torque received by the output shaft 14 is a positive torque during the torque generating operation of the MG2, and is a negative torque during the regenerative operation of the MG2.

Referring to FIG. 4, there is shown a hydraulic control circuit 50 for controlling the shifting actions of the transmission 20 by selective engaging and releasing actions of the first and second brakes B1, B2. This hydraulic control circuit 50 is provided with hydraulic pressure sources in the form of a mechanical oil pump 46 (shown in FIG. 1) and an electric oil pump 48. The mechanical oil pump 46 is connected to a crankshaft 36 of the engine 12 and is driven by the engine 12. The electric oil pump 48 includes an electric motor 48a, and a pump 48b driven by the electric motor 48a. These mechanical and electric oil pumps 46, 48 are driven to suck the working oil through a strainer 52 from an oil pan (not shown), or directly from a return passage 53, and to pressurize the working fluid, so that the pressurized working oil is delivered to a line oil pressure passage 54. The above-indicated oil temperature sensor TS for detecting the temperature of the working oil is built in a valve body 51 in which the hydraulic control circuit 50 is formed. However, the oil temperature sensor TS may be disposed in any other position.

A line-pressure regulating valve 56 shown in FIG. 4 is a relief-type regulator valve, and has a spool 60, a control pressure chamber 68, and a feedback pressure chamber 70. The spool 60 has an open position and a closed position for respectively permitting and inhibiting communication between a supply port 56a connected to a line pressure passage 54, and a discharge port 56b connected to a drain passage 58. The control pressure chamber 68 accommodates a spring 62 that generates a biasing force acting on the spool 60 in a direction toward its closed position, and receives a modulated pressure PM in a modulated-pressure passage 66 through a solenoid-operated shut-off valve 64, for raising a preset level of the line pressure PL. The feedback pressure chamber 70 is connected to the above-indicated line pressure passage 54, for generating a thrust force acting on the spool 60 in a direction toward its open position. The line-pressure regulating valve 56 generates one of high and low levels of the line pressure PL. In the line pressure passage, the hydraulic pressure switch SW3 which is turned on when the line pressure PL has the high level and turned off when the line pressure PL has the low level.

A modulated-pressure regulating valve 72 lowers the received line pressure PL into the predetermined modulated pressure PM lower than the line pressure PL, irrespective of a change of the line pressure PL. The modulated pressure PM is delivered to the modulated-pressure passage 66, and is applied to a first linear solenoid valve SLB1 provided to control the first brake B1, and a second liner solenoid valve SLB2 provided to control the second brake B2. The first and second linear solenoid valves SLB1, SLB2 generate respective control pressures PC1, PC2 corresponding to respective commanded drive current values $I_{SOL1}$, $I_{SOL2}$ received from the electronic transmission control device 44.

The first linear solenoid valve SLB1 is a normally-open valve which is placed in an open position for permitting communication between its input and output ports when the valve is placed in a de-energized state. As indicated in FIG. 5, the control pressure PC1 generated by the first linear solenoid valve SLB1 decreases with an increase of the drive current value $I_{SOL1}$. However, the first linear solenoid valve SLB1 has operating characteristics wherein there exists an insensitive zone A from 0 to a predetermined value $I_a$ of the drive current $I_{SOL1}$, in which the control pressure PC1 does not decrease with the increase of the drive current value $I_{SOL1}$, as also indicated in FIG. 5. The second linear solenoid valve SLB2 is a normally-closed valve which is placed in a closed position for inhibiting communication between its input and output ports when the valve is placed in a de-energized state. As indicated in FIG. 6, the control pressure PC2 generated by the second linear solenoid valve SLB2 increases with an increase of the drive current value $I_{SOL2}$. However, the second linear solenoid valve SLB2 has operating characteristics wherein there exists an insensitive zone B from 0 to a predetermined value $I_b$ of the drive current $I_{SOL2}$, in which the control pressure PC2 does not increase with the increase of the drive current value $I_{SOL2}$, as also indicated in FIG. 6.

A B1 control valve 76 has a spool 78, a control pressure chamber 80, and a feedback pressure chamber 84. The spool 78 has an open position and a closed position for respectively permitting and inhibiting communication between an input port 76a connected to the line pressure passage 54, and an output port 76b for generating an engaging hydraulic pressure PB1 of the first brake B1. The control pressure chamber 80 receives the control pressure PC1 from the first linear solenoid valve SLB1, which acts on the spool 78 in a direction toward its open position. The feedback pressure chamber 84 accommodates a spring 82 that generates a biasing force acting on the spool 78 in a direction toward its closed position, and receives the engaging hydraulic pressure PB1 of the first brake B1. The B1 control valve 76 changes the line pressure PL received from the line pressure passage 54, into the engaging hydraulic pressure PB1 corresponding to the control pressure PC1 received from the first linear solenoid valve SBL1. The engaging hydraulic pressure PB1 is applied to the first brake B1 through a B1 apply control valve 86 that functions as an interlocking valve.

A B2 control valve 90 has a spool 92, a control pressure chamber 94, and a feedback pressure chamber 98. The spool 92 has an open position and a closed position for respectively permitting and inhibiting communication between an input port 90a connected to the line pressure passage 54, and an output port 90b for generating an engaging hydraulic pressure PB2 of the second brake B2. The control pressure chamber 94 receives the control pressure PC2 from the second linear solenoid valve SLB2, which acts on the spool 92 in a direction toward its open position. The feedback pressure chamber 98 accommodates a spring 96 that generates a biasing force acting on the spool 92 in a direction toward its closed position, and receives the engaging hydraulic pressure PB2 of the second brake B2. The B2 control valve 90 changes the line pressure PL received from the line pressure passage 54, into the engaging hydraulic pressure PB2 corresponding to the control pressure PC2 received from the second linear solenoid valve SBL2. The engaging hydraulic pressure PB2 is applied to the second brake B2 through a B2 apply control valve 100 that functions as an interlocking valve.

The B1 apply control valve 86 has a spool 102, a pressure chamber 104 and a pressure chamber 108. The spool 102 has an open position and a closed position for respectively permitting and inhibiting communication between an input port 86a receiving the engaging hydraulic pressure PB1 of the first brake B1 from the B1 control valve 76, and an output port 86b connected to the first brake B1. The pressure chamber 104 receives the modulated pressure PM, which acts on the spool 102 in a direction toward its open position, while the pressure chamber 108 accommodates a spring 106 generating a biasing force acting on the spool 102 in a direction toward its closed position, and receives the engaging hydraulic pressure PB2 of the second brake B2. The B1 apply control valve 86 is held in the open position until it receives the engaging hydraulic pressure PB2 for engaging the second brake B2, and is brought to its closed position upon reception of the engaging hydraulic pressure PB2, to prevent an engaging action of the first brake B1.

The B1 apply control valve 86 further has a pair of ports 110a, 110b which are closed when the spool 102 is placed in the open position (indicated in FIG. 4 on the right side of its centerline), and opened when the spool 102 is placed in the closed position (indicated in FIG. 4 on the left side of its centerline). The hydraulic pressure switch SW2 for detecting the engaging hydraulic pressure PB2 of the second brake B2 is connected to the port 110a, while the second brake B2 is connected directly to the other port 110b. This hydraulic pressure switch SW2 is placed in an on state when the engaging hydraulic pressure PB2 is higher than a predetermined level, and is placed in an off state when the engaging hydraulic pressure PB2 is not higher than the predetermined level. Since the hydraulic pressure switch SW2 is connected to the second brake B2 through the B1 apply control valve 86, the hydraulic pressure switch SW2 can detect not only an abnormality of the engaging hydraulic pressure PB2, but also abnormalities of hydraulic components associated with the first brake B1, such as abnormalities of the first linear solenoid valve SLB1, B1 control valve 76 and B1 apply control valve 86.

Like the B1 apply control valve 86, the B2 apply control valve 100 has a spool 112, a pressure chamber 114 and a pressure chamber 118. The spool 112 has an open position and a closed position for respectively permitting and inhibiting communication between an input port 100a receiving the engaging hydraulic pressure PB2 of the second brake B2 from the B2 control valve 90, and an output port 100b connected to the second brake B2. The pressure chamber 114 receives the modulated pressure PM, which acts on the spool 112 in a direction toward its open position, while the pressure chamber 118 accommodates a spring 116 generating a biasing force acting on the spool 112 in a direction toward its closed position, and receives the engaging hydraulic pressure PB1 of the first brake B1. The B2 apply control valve 100 is held in the open position until it receives the engaging hydraulic pressure PB1 for engaging the first brake B1, and is brought to its closed position upon reception of the engaging hydraulic pressure PB1, to prevent an engaging action of the second brake B2.

The B2 apply control valve 100 also has a pair of ports 120a, 120b which are closed when the spool 112 is placed in the open position (indicated in FIG. 4 on the right side of its centerline), and opened when the spool 112 is placed in the closed position (indicated in FIG. 4 on the left side of its centerline). The hydraulic pressure switch SW1 for detecting the engaging hydraulic pressure PB1 of the first brake B1 is connected to the port 120a, while the first brake B1 is connected directly to the other port 120b. This hydraulic pressure switch SW2 is placed in an on state when the engaging hydraulic pressure PB1 is higher than a predetermined level, and is placed in an off state when the engaging hydraulic pressure PB1 is not higher than the predetermined level. Since the hydraulic pressure switch SW1 is connected to the first brake B1 through the B2 apply control valve 100, the hydraulic pressure switch SW1 can detect not only an abnormality of the engaging hydraulic pressure PB1, but also abnormalities of hydraulic components associated with the second brake B2, such as abnormalities of the second linear solenoid valve SLB2, B2 control valve 90 and B2 apply control valve 100.

Referring to the table of FIG. 7 for explaining the hydraulic control circuit 50 configured as described above, a mark "O" indicates the energized or engaged state while a mark "X" indicates the de-energized or released state. That is, when the first linear solenoid valve SLB1 and the second linear solenoid valve SLB2 are both placed in the energized state, the first brake B1 is placed in the released state while the second brake B2 is placed in the engaged state, so that the transmission 20 is placed in the low gear position L. When the first linear solenoid valve SLB1 and the second linear solenoid valve SLB2 are both placed in the released state, the first brake B1 is placed in the engaged state while the second brake B2 is placed in the released state, so that the automatic transmission portion 22 is placed in the high gear position H.

FIG. 8 is a functional block diagram for explaining major control functions of the electronic control devices 22, 34, 44. Hybrid drive control means 130 shown in FIG. 8 is enabled to operate when a power switch is operated with the brake pedal 26 being depressed after insertion of a key into a key slot not shown. The hybrid drive control means 130 calculates the vehicle operator's required vehicle output on the basis of the operation amount of the accelerator pedal, and controls the engine 12 and/or the MG2 to generate the vehicle operator's required vehicle output, with high fuel economy and a reduced amount of exhaust emissions. The hybrid drive control means 130 selects one of vehicle drive modes depending upon the running condition of the vehicle. For instance, the vehicle drive modes includes a motor drive mode in which only the MG2 is operated as the drive power source with the engine 12 held at rest, a drive mode in which the MG2 is operated as the drive power source while the engine 12 is operated to operate the MG2 as the electric generator, and an engine drive mode in which the engine 12 is operated to generate a vehicle drive force to be mechanically transmitted to the drive wheels 18.

The hybrid drive control means 130 controls the MG1 to control the operating speed of the engine 12 such that the engine 12 operates along a highest fuel economy curve. When the MG2 is operated to provide an assisting torque, the hybrid drive control means 130 places the transmission 20 in the low gear position L to increase the assisting torque to be added to the output shaft 14 while the vehicle speed V is relatively low. When the vehicle speed V is relatively high, the hybrid drive control means 130 places the transmission 20 in the high gear position H to lower the MG2 speed, for reducing a power loss. Thus, the hybrid drive control means 130 implements the assisting torque control so as to assure an efficient operation of the MG2 to provide the assisting torque. During a coasting run of the vehicle, the hybrid drive control means 130 controls the hybrid drive system such that the MG1 or MG2 is driven by a kinetic or inertial energy of the coasting vehicle, to convert the kinetic energy into an electric energy to be stored in the electric-energy storage device 32. A control operation of the hybrid drive control means 130 in the engine drive mode will be described in detail, by way of example. In the engine drive mode, the hybrid drive control means 130 operates the engine 12 in an efficiently operating state with high degrees of vehicle drivability and fuel economy, and optimizes the proportion of the drive forces generated by the engine 12 and MG2, and the reaction force generated during an operation of the MG1 as the electric generator.

The hybrid drive control means 130 is preferably configured to determine a target output shaft torque $T_R$, according to a stored drive force map and on the basis of the vehicle operator's required vehicle output as represented by the operation amount of the accelerator pedal and the vehicle running speed. The hybrid drive control means 130 then calculates a required output shaft power on the basis of the calculated target output shaft torque $T_R$, while taking account of a required amount of charging of the electric-energy storage device, and calculates a target engine power so as to obtain the calculated required output shaft power, while taking account of the power transmission loss, loads acting on optionally installed devices, the assisting torque generated by the MG2, and the selected gear position of the transmission 20. The hybrid drive control means 130 controls the engine 12 and the amount of electric energy generated by the MG1, to provide the engine speed and torque for obtaining the calculated target engine power, such that the engine 12 operates along a highest fuel economy curve (a stored fuel economy map or relationship), as indicated in FIG. 9, which is obtained by experimentation to provide a compromise between the vehicle drivability and the fuel economy and which is defined in a two-dimensional coordinate system in which the engine speed and torque are taken along respective two axes.

The highest fuel-economy curve indicated in FIG. 9 is one of iso-fuel-economy curves at which the fuel consumption is the lowest and which connects highest fuel-economy points obtained by experimentation such that the above-indicated one iso-fuel-economy curve passes those highest fuel-economy points as the engine speed rises. Namely, the highest fuel-economy curve is a succession of lowest fuel-consumption points of the engine 12 obtained by experimentation so as to provide a compromise between the vehicle drivability and the fuel economy. In FIG. 9, solid lines "a", "b" and "c" are examples of target engine power curves each of which is a succession of iso-power points of the engine 12. The target engine power increases in the order of the solid lines "a", "b" and "c".

The hybrid drive control means 130 controls the inverters 30, 40 such that the electric energy generated by the MG1 is supplied to the electric-energy storage device 32 and MG2 through the inverters 30, 40, so that a major portion of the drive force of the engine 12 is mechanically transmitted to the output shaft 14, while the rest of the drive force of the engine 12 is used to operate the MG1 as the electric generator for converting this mechanical energy into the electric energy, which is supplied to the MG2 through the inverters 30, 40, to operate the MG2 as the electric motor for generating a mechanical energy to be transmitted to the output shaft 14 through the transmission 20. Components associated with the generation of the electric energy by the MG1 and the consumption of the electric energy by the MG2 constitute an electric path through which the electric energy obtained by conversion of the major portion of the drive force of the engine 12 by the MG1 is supplied to the MG2 for conversion of the electric energy into the mechanical energy. The hybrid drive control means 130 permits the electric energy stored in the electric-energy storage device 32, as well as the electric energy generated by the MG1, to be supplied to the MG2 through the inverter 30, for operating the MG2.

The hybrid drive control means 130 is further configured to control the MG1 by utilizing the differential function of the power distributing device 16, so as to hold the engine speed substantially constant or control the engine speed to a desired value, irrespective of whether the vehicle is stationary or running. In other words, the hybrid drive control means 130 makes it possible to control the operating speed of the MG1 to a desired value while holding the engine speed substantially constant or changing the engine speed to the desired value.

The hybrid drive control means 130 includes engine output control means functioning to command an engine-output control device (not shown) for controlling the engine 12, so as to provide a required output, by controlling a throttle actuator to open and close an electronic throttle valve, and controlling an amount and time of fuel injection by a fuel injecting device into the engine 12, and the timing of ignition of an igniter by an ignition device, alone or in combination.

Referring back to FIG. 8, shifting-action determining means 132 is configured to determine a shifting action of the transmission 20 on the basis of the vehicle speed V and a vehicle drive force P and according to stored shifting boundary lines indicated in FIG. 10 by way of example. Preferably, the shifting-action determining means 132 makes a determination as to whether a power-on shifting action of the transmission 20 should take place, that is, whether the transmission 20 should be shifted when the operation amount of the accelerator pedal as detected by the accelerator operation-amount sensor AS exceeds a predetermined threshold.

When the shifting-action determining means 132 determines that a shifting action of the transmission 20 should take place, shifting control means 134 controls the first brake B1 and second brake B2 to automatically shift the transmission 20 to perform the determined shifting action. Namely, when the shifting-action determining means 132 determines the shifting action of the transmission 20 from the low gear position L to the high gear position H, the shifting control means 134 controls the hydraulic actuators through the hydraulic control circuit 50 to engage the first brake B1 and release the second brake B2. When the shifting-action determining means 132 determines that the shifting action of the transmission 20 from the high gear position H to the low gear position, the shifting control means 134 controls the hydraulic actuators through the hydraulic control circuit 50 to release the first brake B1 and engage the second brake B2. That is, both the shifting action of the transmission 20 from the low gear position L to the high gear position H, and the shifting action from the high gear position H to the low gear position L are so-called "clutch-to-clutch shifting actions".

Step-variable-transmission-state determining means 136 is configured to determine whether the operating state of the transmission 20 satisfies a predetermined condition. Preferably, the operating state of the transmission 20 is the temperature of the working fluid used to operate the frictional coupling elements in the form of the brakes B1, B2, while the predetermined condition is a condition that the temperature of the working fluid is lower than a predetermined threshold. In other words, the step-variable-transmission-state determining means 136 is preferably configured to determine whether the temperature of the working fluid detected by the oil temperature sensor TS is lower than the predetermined threshold.

Energy-storage-device-state determining means 138 is configured to determine whether the operating state of the electric-energy storage device 32 satisfies a predetermined condition. Preferably, the operating state of the electric-energy storage device 32 is an upper limit of a charging/discharging amount (an upper limit of input/output) of the electric-energy storage device 32, while the predetermined condition is a condition that the upper limit is higher than a predetermined threshold. In other words, the energy-storage-device-state determining means 138 is configured to determine whether the upper limit of the charging/discharging amount of the electric-energy storage device 32 is higher than the predetermined threshold.

MG2-torque-reduction control means (second-electric-motor-torque-reduction control means) 140 is configured to implement a torque reduction control for reducing the output torque of the MG2 during a shifting action (a power-on shifting action, in particular) of the transmission 20. That is, when the shifting-action determining means 132 determines that a shifting action of the transmission 20 should take place, the MG2-torque-reduction control means 140 holds the output torque of the MG2 at a value smaller than the present value by a predetermined toque reduction amount $\Delta T_{d2}$ until the shifting action of the transmission 20 is completed. This predetermined toque reduction amount $\Delta T_{d2}$ may be held constant from the moment of initiation of the shifting action to the moment of termination of the shifting action, or may vary in the process of the shifting action. The predetermined toque reduction amount $\Delta T_{d2}$ may be the same for both the shifting action from the low gear position L to the high gear position H and the shifting action from the high gear position H to the low gear position L, or may take two different values for the respective two shifting actions.

MG2-torque-reduction-control limiting means (second-electric-motor-torque-reduction-control limiting means) 142 is configured to limit or reduces the torque reduction amount $\Delta T_{d2}$ of the MG2 used by the MG2-torque-reduction control means 140 for implementing the torque reduction control, according to the upper limit of the charging/discharging amount of the electric-energy storage device 32. Namely, the MG2-torque-reduction-control limiting means 142 limits or reduces the torque reduction amount $\Delta T_{d2}$ (determined irrespective of the upper limit of the charging/discharging amount of the electric-energy storage device 32) of the MG2 to a reduced amount $\Delta T_{d2}'$ so that the amount of an electric energy input to the electric-energy storage device 32 as a result of a regenerative operation of the MG2 due to the torque reduction control of the MG2 does not exceed the upper limit of the charging/discharging amount. The reduced torque reduction amount $\Delta T_{d2}'$ is calculated on the basis of the stored electric energy amount SOC or temperature of the electric-energy storage device 32, and according to a predetermined amount between the reduced torque reduction amount $\Delta T_{d2}'$ and the amount SOC or temperature.

MG1-torque-reduction control means (first-electric-motor-torque-reduction control means) 144 is configured to implement a torque reduction control for reducing the output torque of the MG1. When at least one of the operating states of the transmission 20 and the electric-energy storage device 32 satisfies the predetermined condition, the amount of limitation of the torque reduction amount of the MG2 by the above-described MG2-torque-reduction control limiting means 142 is made smaller than when none of the operating states of the transmission 20 and electric-energy storage device 32 satisfy the predetermined conditions, and the MG1-torque-reduction control means 144 implements the torque reduction control for reducing the output torque of the MG1. Namely, when an affirmative determination is obtained by the step-variable-transmission-state determining means 136 and the energy-storage-device-state determining means 138, the amount of limitation of the torque reduction amount of the MG2 is made smaller than when negative determinations are obtained by the determining means 136, 138, and the torque reduction control for reducing the output torque of the MG1 is implemented by the MG1-torque-reduction control means 144. Preferably, the limitation of the torque reduction amount of the MG2 is inhibited while the torque reduction control for reducing the output torque of the MG1 is implemented by the MG1-torque-reduction control means 144. A predetermined torque reduction amount $\Delta T_{d1}$ of the MG1 in the torque reduction control by the MG1-torque-reduction control means 144 is calculated on the basis of the predetermined torque reduction amount $\Delta T_{d2}$ of the MG2 or the stored electric energy amount SOC or temperature of the electric-energy storage device 32, and according to a predetermined relationship between the predetermined torque reduction amount $\Delta T_{d1}$ or the electric energy amount SOC or temperature of the electric-energy storage device 32.

FIGS. 11 and 12 are time charts for explaining in detail the torque reduction control of the MG2 upon a shifting action, according to the present embodiment. In the example of FIG. 11, the shifting action (shift-up action) from the low gear position L to the high gear position H is performed. In the example of FIG. 12, the shifting action (shift-down action) from the high gear position H to the low gear position L is performed. In FIGS. 11 and 12, solid lines indicate the control according to the present embodiment, while one-dot chain lines indicate the prior art control wherein the torque reduction control of the MG1 is not implemented during the torque reduction control of the MG2.

At a point of time t1 indicated in FIG. 11, a shift-up command is generated to perform the shifting action from the low gear position L to the high gear position H, and a control of a command value of the engaging pressure of the first brake B1 is initiated to gradually increase the engaging pressure of the first brake B1. According to the present embodiment, the output torque of the MG2 is reduced by the predetermined torque reduction amount $\Delta T_{d2}$, while the output torque of the MG1 is reduced by the predetermined torque reduction amount $\Delta T_{d1}$. The reduction of the output torque of the MG1 is caused by reduction of a reaction force due to reduction of the amount of generation of the electric energy by the MG1. This torque reduction control of the MG1 together with the torque reduction control of the MG2 effectively prevents excessive regeneration of the electric energy by the MG1 due to the torque reduction control of the MG2, and permits sufficient reduction of the operating speed of the MG2 during a time period ending at a point of time t2 corresponding to a duration of the shifting action, which is calculated by a guard timer, for instance. According to the prior art control indicated by the one-dot chain lines, on the other hand, the output torque of the MG2 is reduced by the reduced torque reduction amount $\Delta T_{d2}'$ smaller than the predetermined torque reduction amount $\Delta T_{d2}$, and the torque reduction control of the MG1 is not implemented. The prior art control wherein the output torque of the MG2 is held at a comparatively large value causes a delay of the shifting action, that is, a delay of the engaging action of the first brake B1, resulting in a failure to sufficiently reduce the operating speed of the MG2 during the time period ending at the point of time t2, and a considerable shifting shock due to completion of the engaging action of the first brake B1 at the point of time t2.

At a point of time t1 indicated in FIG. 12, a shift-down command is generated to perform the shifting action from the high gear position H to the low gear position L, and a control of a command value of the engaging pressure of the second brake B2 is initiated to gradually increase the engaging pressure of the second brake B2. According to the present embodiment, the output torque of the MG2 is reduced by the predetermined torque reduction amount $\Delta T_{d2}$ after a temporary gradual increase, while the output torque of the MG1 is reduced by the predetermined torque reduction amount $\Delta T_{d1}$. This torque reduction control of the MG1 together with the torque reduction control of the MG2 effectively prevents excessive regeneration of the electric energy by the MG1 due to the torque reduction control of the MG2, and permits a sufficient rise of the operating speed of the MG2 during a time period ending at a point of time t2 corresponding to a duration of the shifting action, which is calculated by a guard timer, for instance. According to the prior art control indicated by the one-dot chain lines, on the other hand, the output torque of the MG2 is reduced by the reduced torque reduction amount $\Delta T_{d2}'$ smaller than the predetermined torque reduction amount $\Delta T_{d2}$, and the torque reduction control of the MG1 is not implemented. The prior art control wherein the output torque of the MG2 is held at a comparatively large value causes a delay of the shifting action, that is, a delay of the engaging action of the second brake B1, resulting in a failure to sufficiently raise the operating speed of the MG2 during the time period ending at the point of time t2, and a considerable shifting shock due to completion of the engaging action of the second brake B2 at the point of time t2. Although the same reference signs are used for convenience' sake in FIGS. 11 and 12, the time period between the points of time t1 and t2 may differ depending upon the shift-up action or the shift-down action. Further, the predetermined torque reduction amounts of the MG1 and MG2 may be different from each other.

FIG. 13 is a flow chart illustrating a major portion of the torque reduction control during the shifting action, under the control of the electronic control device 34. The torque reduction control is repeatedly executed with a predetermined cycle time.

The torque reduction control is initiated with step S1 ("step" being hereinafter omitted) corresponding to the shifting-action determining means 132, to determine whether a power-on shifting command has been generated, that is, whether the transmission 20 has been commanded to change its gear position while the operation amount of the accelerator pedal detected by the accelerator operation-amount sensor AS is higher than the predetermined threshold. If a negative determination is obtained in S1, the present routine is terminated. If an affirmative determination is obtained in S1, the control flow goes to S2 to calculate the predetermined torque reduction amount $\Delta T_{d2}$ of the MG2 and require the torque reduction control of the MG2. Then, the control flow goes to S3 corresponding to the step-variable-transmission-state determining means 136 and the energy-storage-state determining means 138, to determine whether at least one of the state of the transmission 20 (temperature of the working fluid detected by the oil temperature sensor TS) and the state of the electric-energy storage device 32 (upper limit of the charging/discharging amount) satisfies the predetermined condition (the temperature lower than the predetermined threshold, or the upper limit being higher than the predetermined threshold). If a negative determination is obtained in S3, the control flow goes to S4 to set the torque reduction amount of the MG2 to the reduced torque reduction amount $\Delta T_{d2}'$ smaller than the predetermined torque reduction amount $\Delta T_{d2}$ (to select the limitation of the torque reduction amount of the MG2), and to inhibit the torque reduction control of the MG1, and then goes to S5 corresponding to the MG2-torque-reduction control means 140 and the MG1-torque-reduction control means 144, to implement the torque reduction control of the MG2. Then, the present routine is terminated. If an affirmative determination is obtained in S3, the control flow goes to step S6 to set the torque reduction amount of the MG2 to the predetermined torque reduction amount $\Delta T_{d2}$ (to inhibit the limitation of the torque reduction amount of the MG2), and to set the torque reduction amount of the MG1 to the predetermined torque reduction amount $\Delta T_{d1}$, and then goes to S5 to implement the torque reduction controls of the MG1 and MG2. Then, the present routine is terminated. It will be understood that S4 and S6 correspond to the MG2-torque-reduction control limiting means 142.

The present embodiment described above is configured such that the control apparatus includes the second-electric-motor-torque-reduction control means 140 (S5) for implementing the torque reduction control for reducing the output torque of the MG2 during a shifting action of the transmission 20, the second-electric-motor-torque-reduction-control limiting means 142 (S4 and S6) for limiting or reducing the torque reduction amount of the MG2 in the torque reduction control by the second-electric-motor-torque-reduction control means 140, according to the upper limit of the charging/discharging amount of the electric-energy storage device 32, and the first-electric-motor-torque-reduction control means 144 (5) for implementing the torque reduction control for reducing the output torque of the MG1 motor. The second-electric-motor-torque-reduction-control limiting means 142 is configured such that when at least one of the operating states of the transmission 20 and the electric-energy storage device 32 satisfies the predetermined condition, the degree of limitation or reduction of the torque reduction amount of the MG2 is reduced with respect to that when at least one of the operating states does not satisfy the predetermined condition, while the output torque of the MG1 is reduced by the first-electric-motor-torque-reduction control means 144. Accordingly, a shifting shock of the transmission 20 upon its shifting action can be reduced by implementing the torque reduction control of the MG1 while reducing the degree of the limitation or reduction of the torque reduction control of the second electric motor when it is determined that the limitation or reduction of the torque reduction control of the MG2 has a considerable influence on the shifting action. Thus, the present embodiment provides a control apparatus for a vehicular power transmitting system wherein the MG2 is connected through the transmission 20 to the drive-wheel-side output shaft 14 to which the drive force of the main drive power source in the form of the engine 12 is distributed by the power distributing device 16, which control apparatus is configured to reduce a shifting shock upon the shifting action of the transmission 20.

The present embodiment is further configured such that the second-electric-motor-torque-reduction-control limiting means 142 inhibits the limitation of the torque reduction amount of the MG2 while the output torque of the MG1 is reduced by the first-electric-motor-torque-reduction control means 140, when the at least one of the operating states of the transmission 20 and the electric-energy storage device 32 satisfies the predetermined condition. In this case, the shifting shock of the transmission 20 upon its shifting action can be practically reduced by implementing the torque reduction control of the MG1 while reducing the degree of the limitation or reduction of the torque reduction control of the MG2 when it is determined that the limitation or reduction of the torque reduction control of the MG2 a considerable influence on the shifting action.

The present embodiment is further configured to use, as the operating state of the transmission 20, the temperature of the working fluid used for controlling the engaging force of the frictional coupling elements provided in the transmission 20, and to use the predetermined condition that the temperature of the working fluid is lower than the predetermined threshold. When the temperature of the working fluid used for the transmission 20 is comparatively low, a response to the line pressure control is comparatively low. In this case, there is a high need for compensation for insufficiency of the engaging force by implementing the torque reduction control of the MG2, so that the transmission 20 is likely to suffer from the shifting shock when the torque reduction control of the MG2 is limited. By limiting the torque reduction control of the MG1 in this case, the amount of the torque reduction of the MG2 is increased by the amount of the torque reduction control of the MG1, so that the shifting shock of the transmission 20 upon its shifting action can be effectively reduced.

The present embodiment is further configured to use, as the operating state of the electric-energy storage device 32, the upper limit of the charging/discharging amount of the electric-energy storage device 32, and to use the predetermined condition that the upper limit of the charging/discharging amount is larger than the predetermined threshold. When the upper limit of the charging/discharging amount of the electric-energy storage device 32 is comparatively large, the amount of limitation of the torque reduction control of the MG2 is comparatively large, so that the transmission 20 is likely to suffer from the shifting shock when the insufficiency of the engaging force of the frictional coupling elements is compensated for by controlling the engaging force. By limiting the torque reduction control of the MG1 in this case, the amount of the torque reduction of the MG2 is increased by the amount of the torque reduction control of the MG1, so that the shifting shock of the transmission 20 upon its shifting action can be effectively reduced.

While the preferred embodiment of this invention has been described above in detail by reference to the drawings, it is to be understood that the invention may be otherwise embodied. In the illustrated embodiment, the MG2-torque-reduction-control limiting means 142 inhibits the limitation of the torque reduction amount of the MG2 while the MG1-torque-reduction control means 144 implements the output torque reduction of the MG1, when at least one of the operating states of the transmission 20 and electric-energy storage device 32 satisfies the predetermined condition. However, the illustrated embodiment may be modified according to the present invention, for example, such that the limitation or reduction of the torque reduction amount of the MG2 is not inhibited, but the degree of the limitation is reduced with respect to that when at least one of the operating states does not satisfy the predetermined condition, while the output torque reduction of the MG2 is implemented by the MG1-torque-reduction control means 144, when at least one of the operating states of the transmission 20 and electric-energy storage device 32 satisfies the predetermined condition. This modification more or less enjoys the advantage of the present invention.

Although the illustrated embodiment of the present invention is applied to the vehicular power transmitting system 10 provided with the step-variable automatic transmission 20 selectively shiftable to the low gear position L and the high gear position H, the principle of the present invention is equally applicable to a vehicular power transmitting system provided with a step-variable automatic transmission 20 having three or more gear positions.

Although the illustrated embodiment of this invention is applied to the vehicular power transmitting system 10 arranged to transmit the output of the MG2 to the drive wheels 18 through the transmission 20 and output shaft 14, the principle of the present invention is equally applicable to a vehicular power transmitting system wherein the engine 18 is used as a drive power source for driving the drive wheels 18 while the output of the MG2 is transmitted to the other drive wheels (rear drive wheels where the drive wheels 18 are front wheels).

It is to be understood that the present invention may be embodied with various other non-illustrated changes which may occur to those skilled in the art without departing from the spirit of this invention.

NOMENCLATURE OF ELEMENTS

Figure 1:
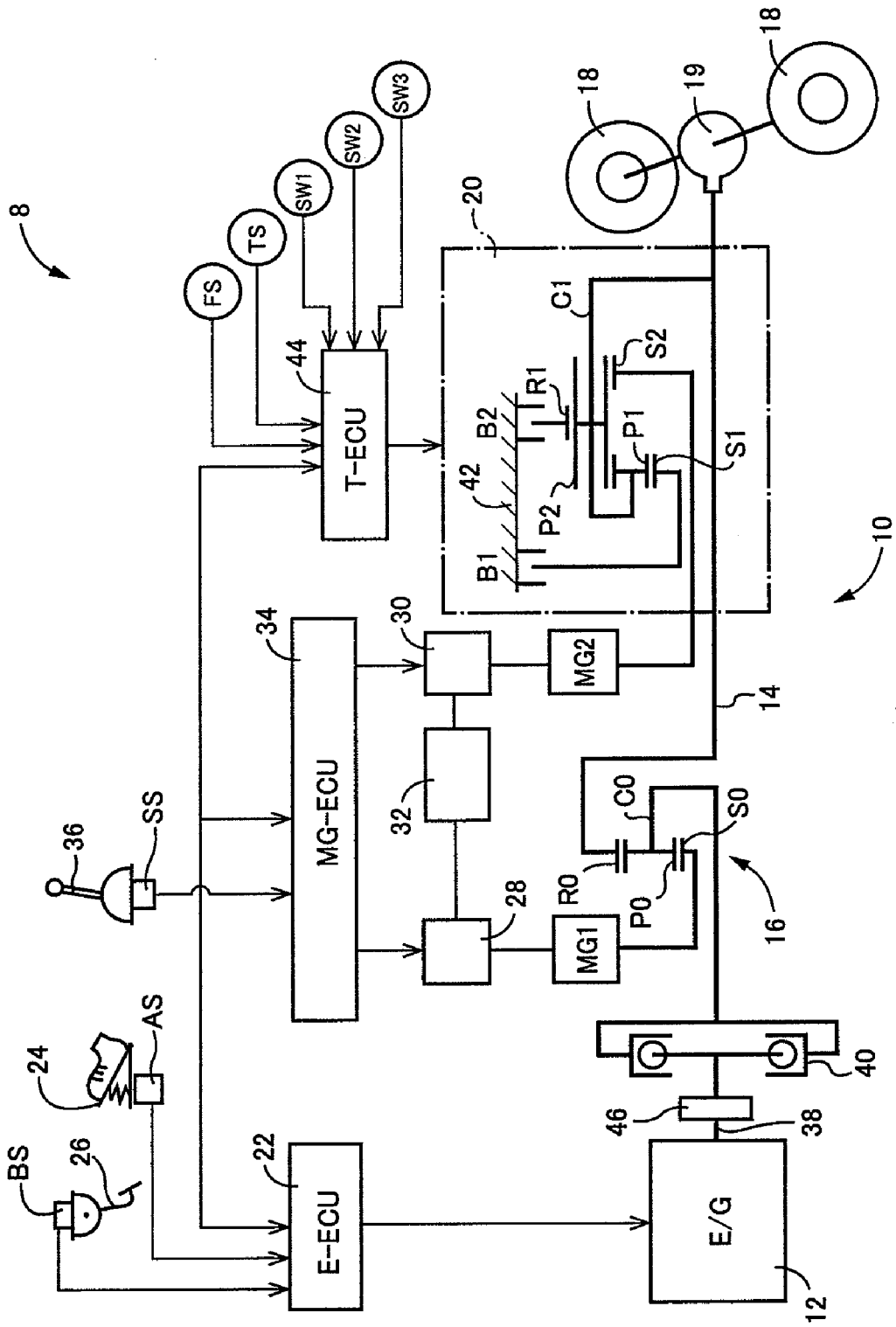
FIG. 1 is a view for explaining a hybrid drive system to which the present invention is suitably applicable.
Figure 2:
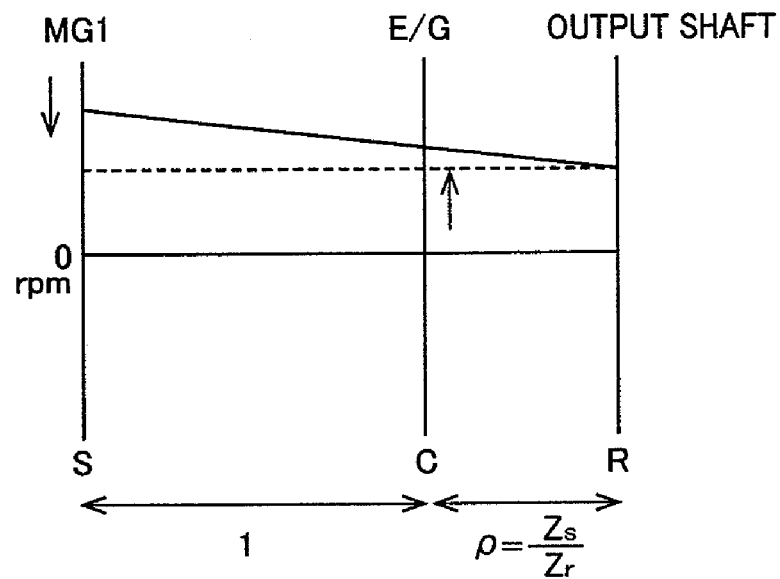
FIG. 2 is a collinear chart indicating relative rotating speeds of rotary elements of a power distributing device provided in the hybrid drive system of FIG. 1.
Figure 3:
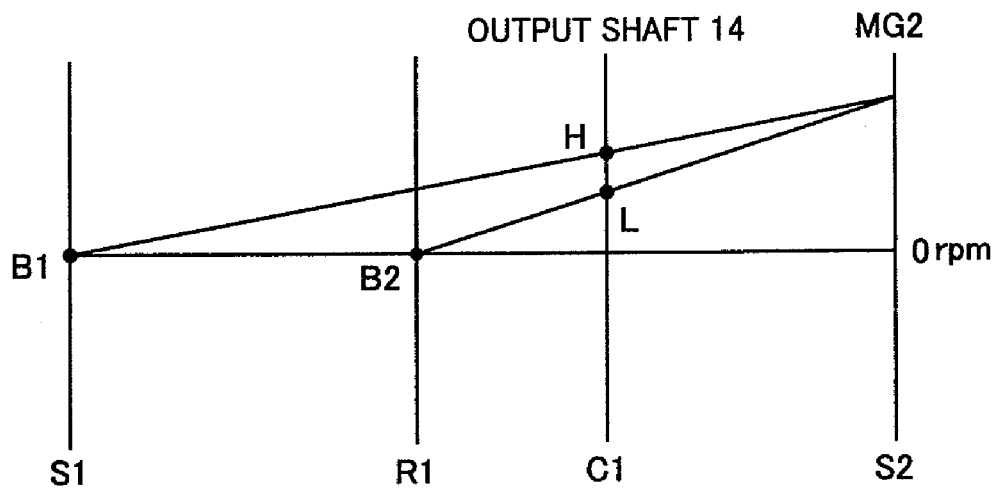
FIG. 3 is a collinear chart indicating relative rotating speeds of rotary elements of step-variable automatic transmission in the form of a planetary gear mechanism of a Ravigneaux type provided in the hybrid drive system of FIG. 1.
Figure 4:
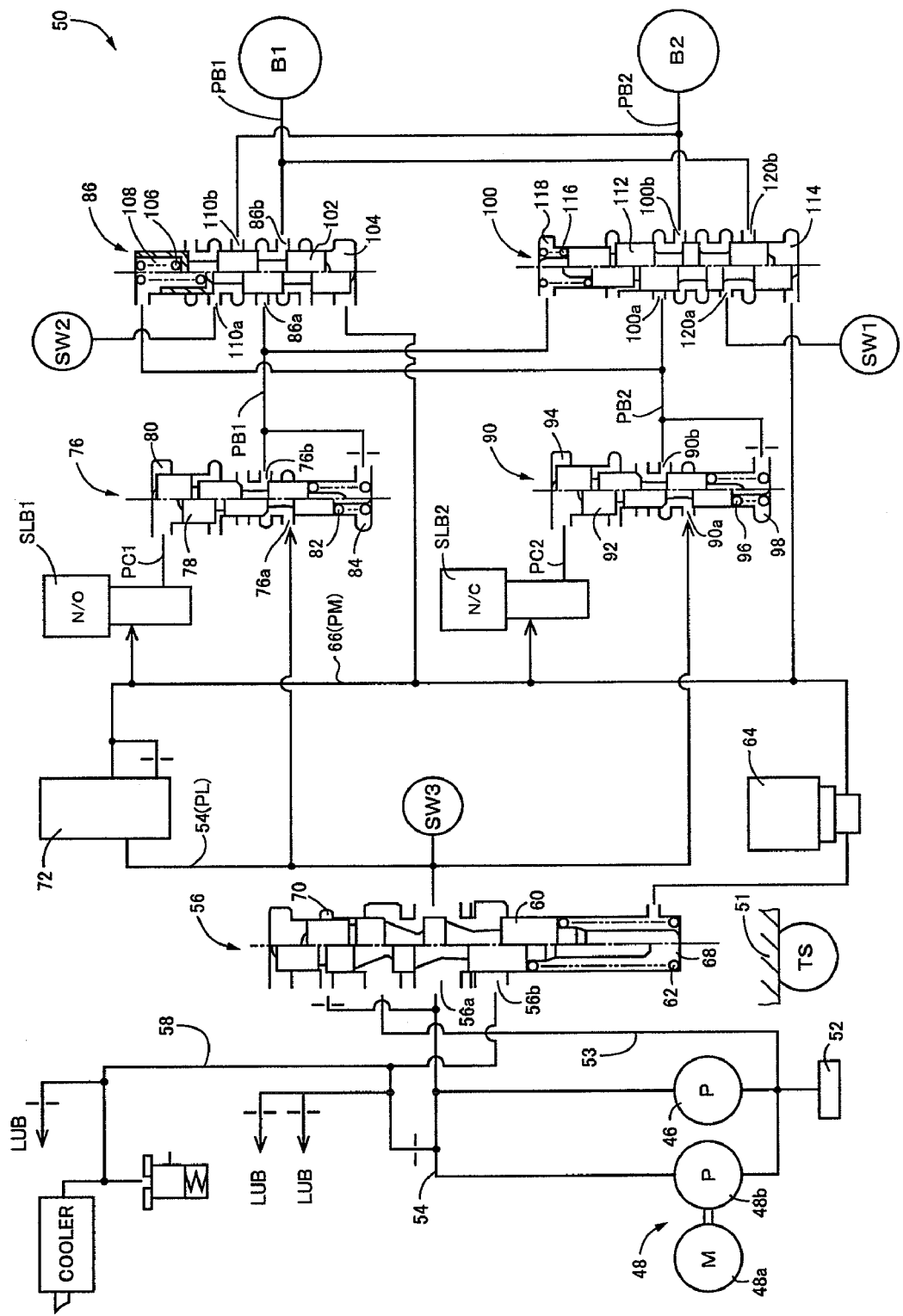
FIG. 4 is a view illustrating a shifting hydraulic control circuit for controlling shifting actions of the step-variable automatic transmission, which are performed by an engaging action of a selected one of brakes provided in the hybrid drive system.
Figure 5:
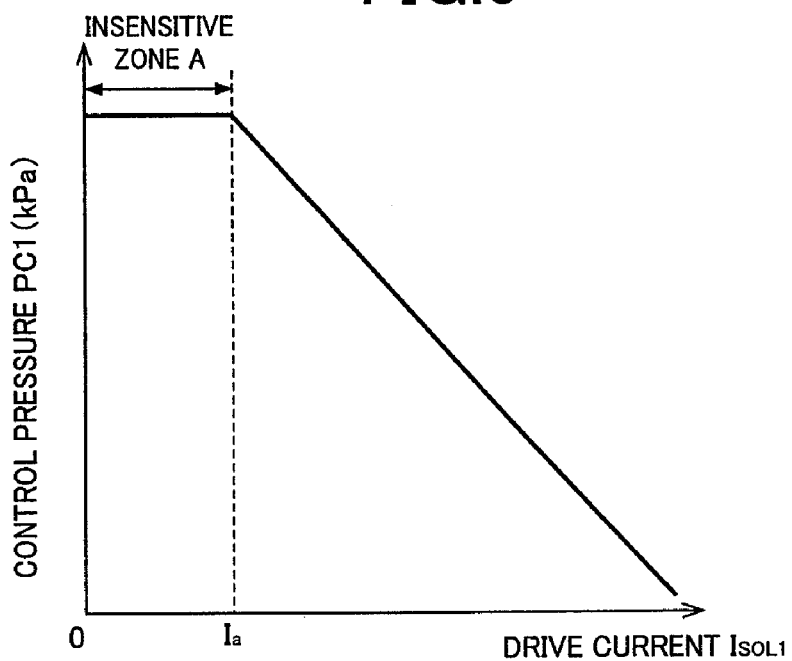
FIG. 5 is a view indicating operating characteristics of a first linear solenoid valve provided in the shifting hydraulic control circuit of FIG. 4.
Figure 6:
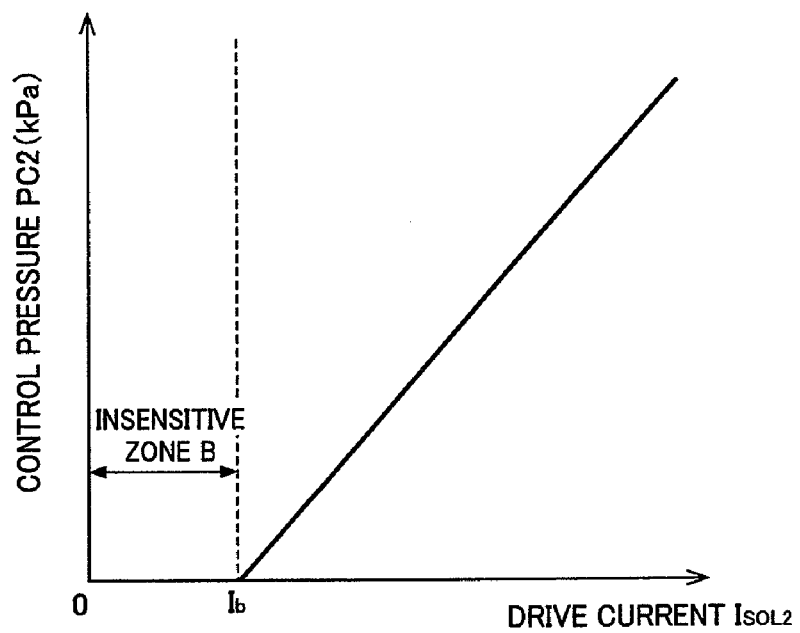
FIG. 6 is a view indicating operating characteristics of a second linear solenoid valve provided in the shifting hydraulic control circuit of FIG. 4.
Figures 7, 8:
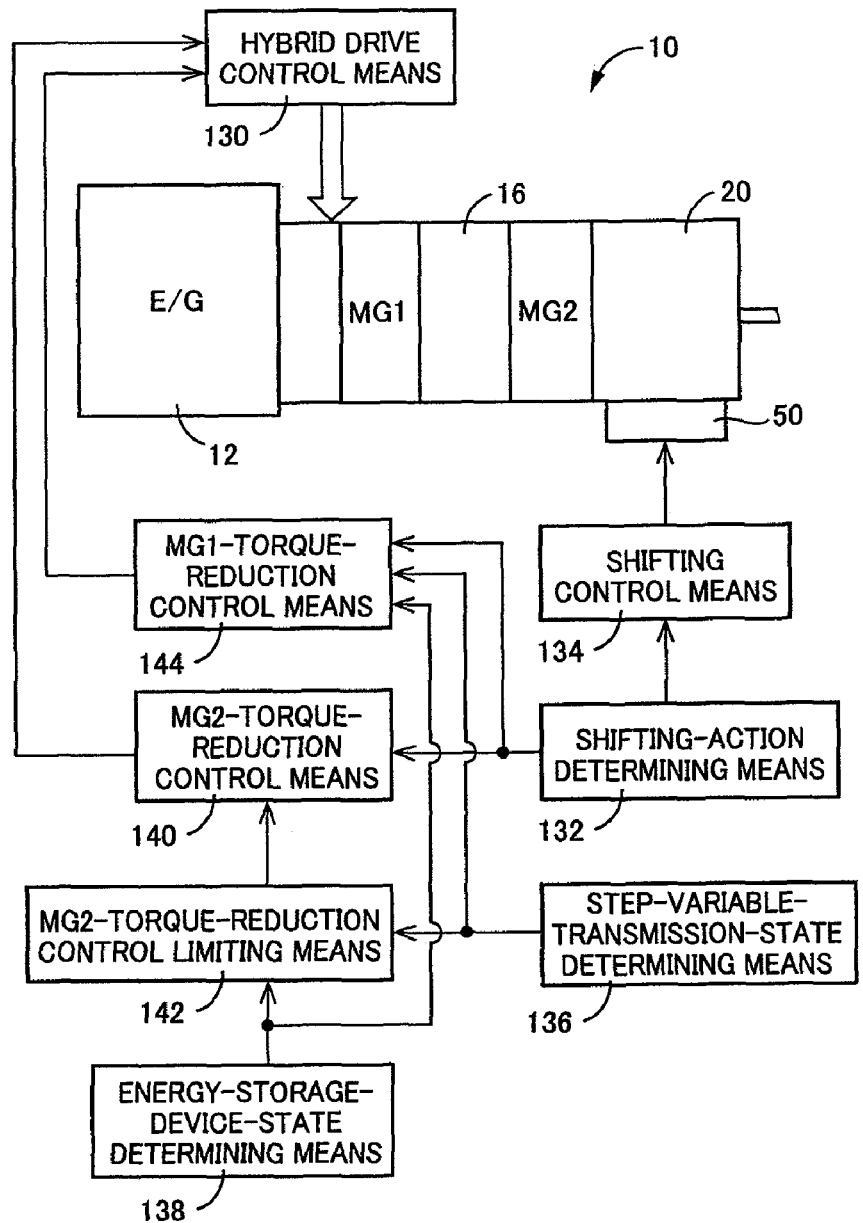
FIG. 7 is a table for explaining an operation of the shifting hydraulic control circuit of FIG. 4.
FIG. 8 is a functional block diagram for explaining major control functions of electronic control devices provided for controlling the hybrid drive system of FIG. 1.
Figure 9:
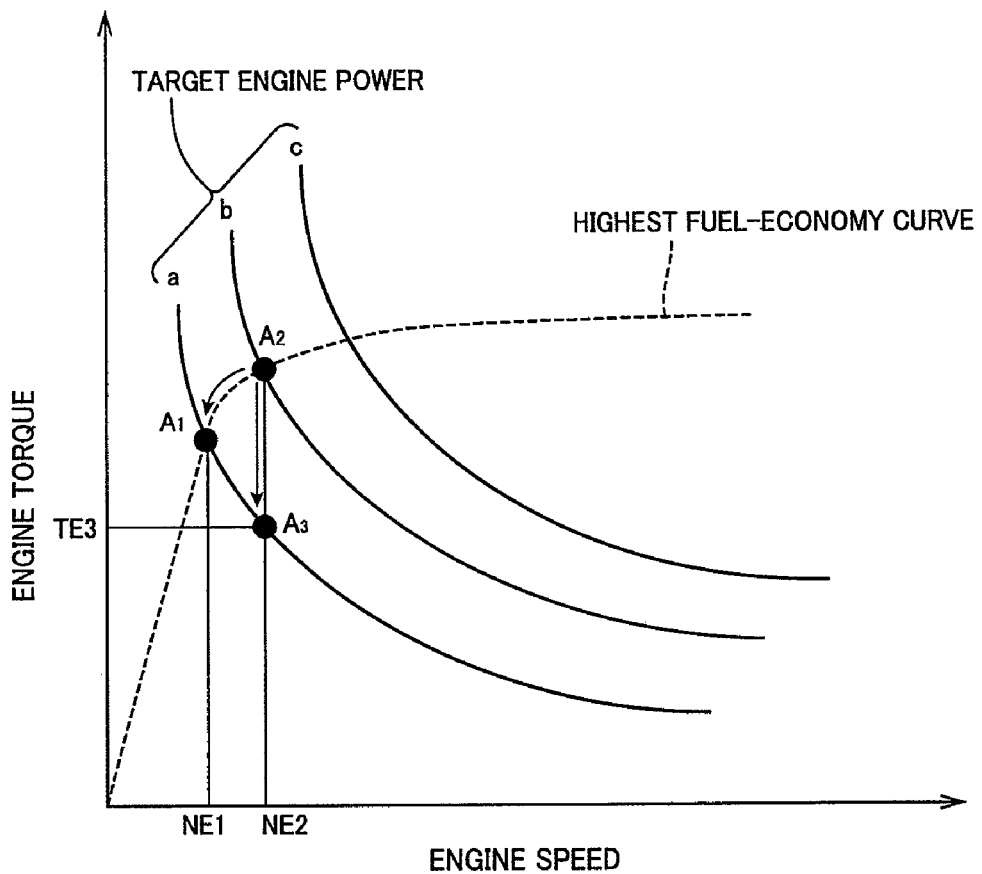
FIG. 9 is a view illustrating a stored relationship obtained by experimentation for controlling an engine provided in the hybrid drive system of FIG. 1.
Figure 10:
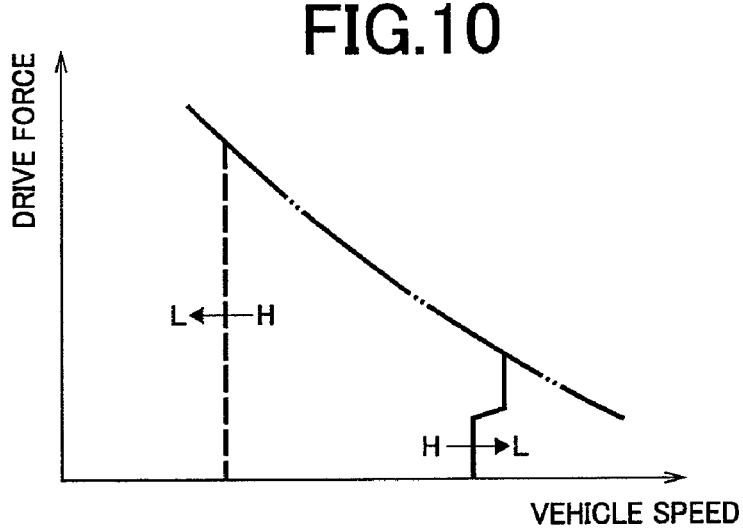
FIG. 10 is a view indicating a stored shifting boundary line map for determining a shifting action of the step-variable automatic transmission provided in the hybrid drive system of FIG. 1.
Figure 11:
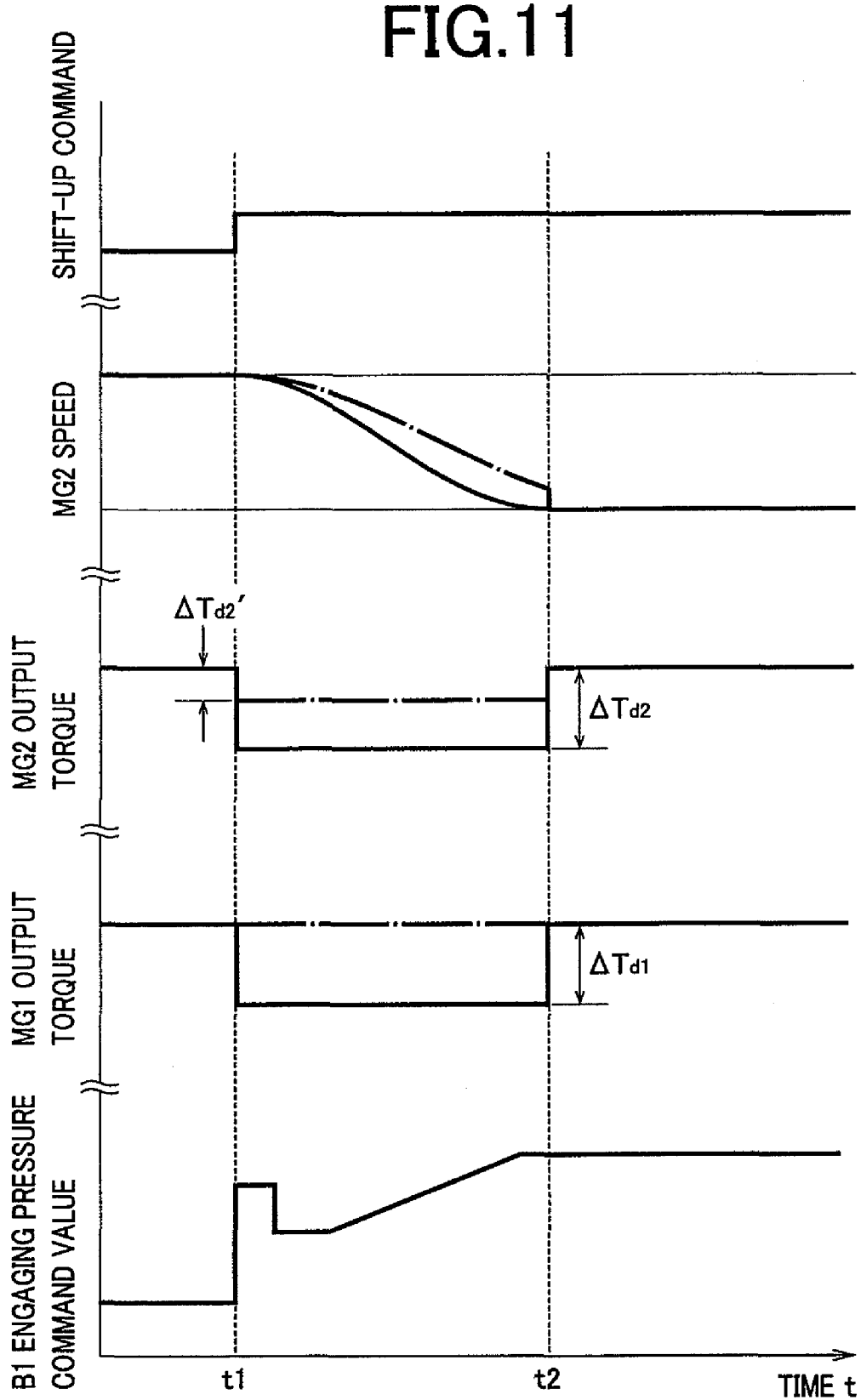
FIG. 11 is a time chart for explaining in detail a torque reduction control upon a shift-up action, according to the illustrated embodiment.
Figure 12:
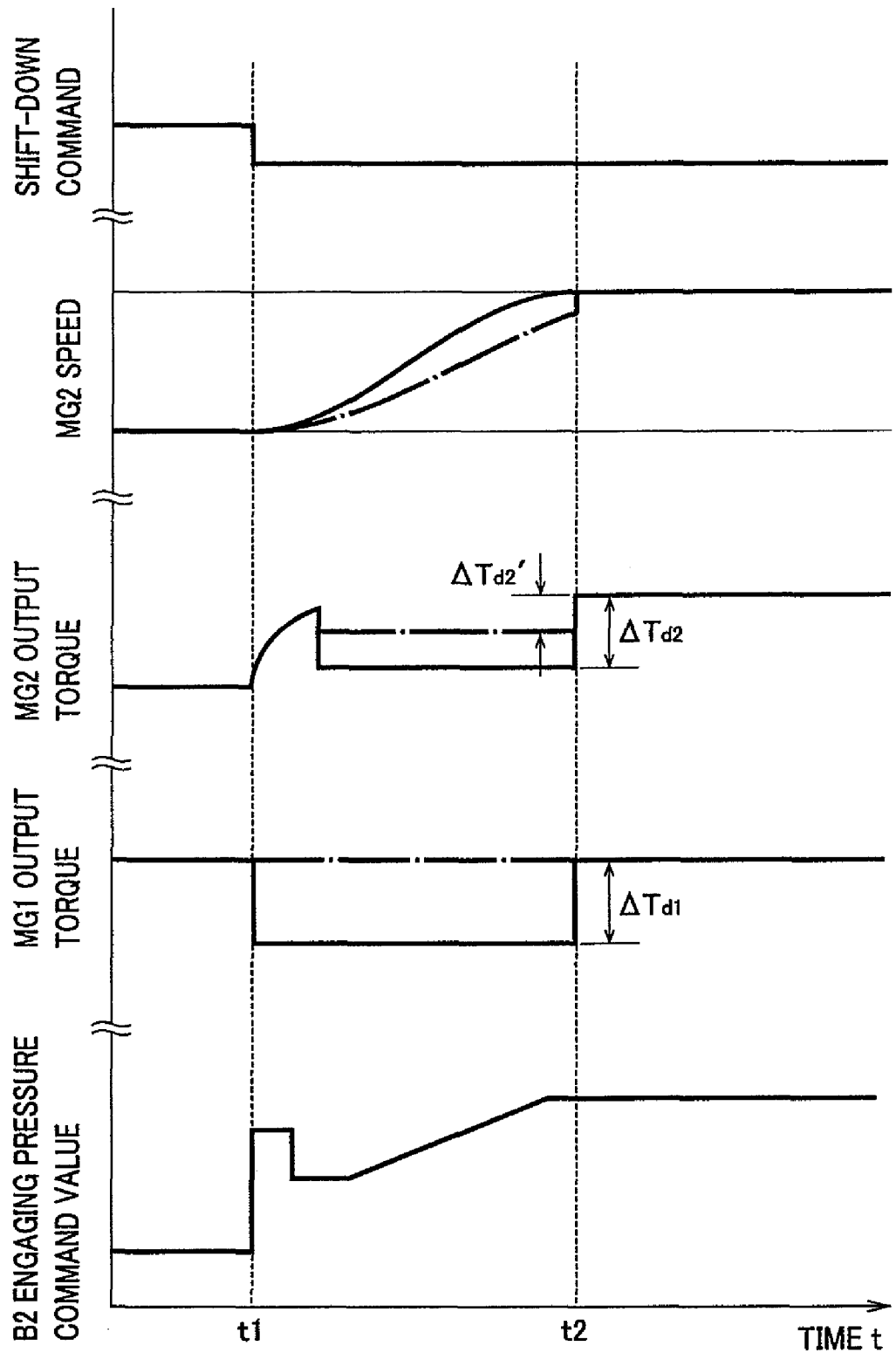
FIG. 12 is a time chart for explaining in detail a torque reduction control upon a shift-down action, according to the illustrated embodiment.
Figure 13:
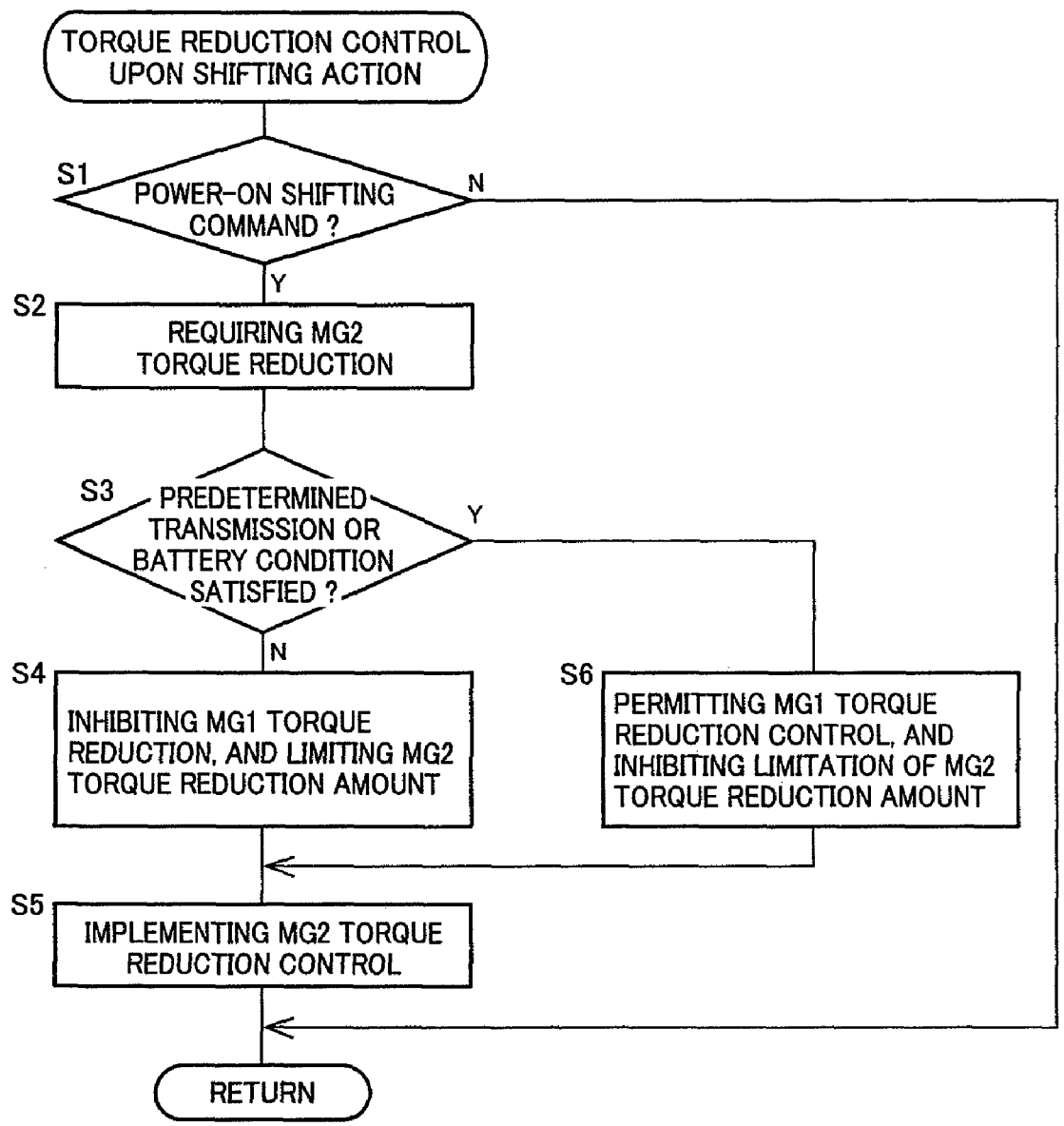
FIG. 13 is a flow chart illustrating a major portion of the torque reduction control upon the shifting action, which is executed by the electronic control device provided for the hybrid control system of FIG. 1.

10: Vehicular power transmitting system
12: Engine (Main drive power source)

24: Output shaft (Power transmitting member)
16: Power distributing device
18: Drive wheels
20: Step-variable automatic transmission (Step-variable transmission)
32: Electric-energy storage device
140: MG2-torque-reduction control means (Second-electric-motor torque-reduction control means)
142: MG2-torque-reduction control limiting means (Second-electric-motor torque-reduction-control limiting means)
144: MG1-torque-reduction control means (First-electric-motor torque-reduction control means)
B1, B2: Brakes (Frictional coupling elements)
MG1: First motor/generator (First electric motor)
MG2: Second motor/generator (Second electric motor)

The invention claimed is:

1. A control apparatus for a vehicular power transmitting system provided with a power distributing device for distributing a drive force generated by a main drive power source to a first electric motor and a power transmitting member, a second electric motor connected through a step-variable transmission to a power transmitting path between said power transmitting member and a drive wheel, and an electric-energy storage device for storing an electric energy generated by said first electric motor and/or said second electric motor and for supplying the electric energy to the first electric motor and/or the second electric motor, said control apparatus including comprising:

second-electric-motor-torque-reduction control means for implementing a torque reduction control for reducing an output torque of said second electric motor during a shifting action of said step-variable transmission;

second-electric-motor-torque-reduction-control limiting means for limiting a torque reduction amount of said second electric motor in the torque reduction control by said second-electric-motor-torque-reduction control means, according to an upper limit of a charging/discharging amount of said electric-energy storage device; and first-electric-motor-torque reduction control means for implementing a torque reduction control for reducing, an output torque of said first electric motor, and wherein said second-electric-motor-torque-reduction-control limiting means is configured such that when at least one of operating states of said step-variable transmission and said electric-energy storage device satisfies a predetermined condition, a degree of limitation of the torque reduction amount of the second electric motor by said second-electric-motor-torque-reduction-control limiting means is reduced with respect to that when at least one of said operating states does not satisfy said predetermined condition, while the output torque of said first electric motor is reduced by said first-electric-motor-torque-reduction control means.

2. The control apparatus according to claim 1, wherein said second-electric-motor-torque-reduction-control limiting means inhibits the limitation of the torque reduction amount of said second electric motor while the output torque of said first electric motor is reduced by said first-electric-motor-torque-reduction control means, when the at least one of the operating states of said step-variable transmission and said electric-energy storage device satisfies said predetermined condition.

3. The control apparatus according to claim 1, wherein the operating state of said step-variable transmission is a temperature of a working fluid used for controlling an engaging force of frictional coupling elements provided in the step-variable transmission, and said predetermined condition is a condition that the temperature of said working fluid is lower than a predetermined threshold.

4. The control apparatus according to claim 1, wherein the operating state of said electric-energy storage device is an upper limit of a charging/discharging amount of the electric-energy storage device, and said predetermined condition is a condition that the upper limit of said charging/discharging amount is larger than a predetermined threshold.

* * * * *